United States Patent
Winzell et al.

(10) Patent No.: US 10,878,542 B2
(45) Date of Patent: Dec. 29, 2020

(54) METHOD AND SYSTEM FOR FILTERING THERMAL IMAGE DATA

(71) Applicant: Axis AB, Lund (SE)

(72) Inventors: Thomas Winzell, Lund (SE); Jesper Bengtsson, Lund (SE); Anthony Hawkins, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 16/563,570

(22) Filed: Sep. 6, 2019

(65) Prior Publication Data

US 2020/0082513 A1 Mar. 12, 2020

(30) Foreign Application Priority Data

Sep. 10, 2018 (EP) .................................. 18193462

(51) Int. Cl.
*G06T 5/00* (2006.01)
*H04N 5/33* (2006.01)

(52) U.S. Cl.
CPC ............... *G06T 5/009* (2013.01); *H04N 5/33* (2013.01); *G06T 2207/10048* (2013.01); *G06T 2207/20208* (2013.01)

(58) Field of Classification Search
CPC ........... G06T 5/009; G06T 2207/20208; G06T 2207/10048; G06T 5/008; G06T 7/11; G06T 7/136; G06T 5/40; H04N 5/33; G01J 2005/0077; G01J 5/10
See application file for complete search history.

(56) References Cited

U.S. PATENT DOCUMENTS

| 6,641,981 B1 * | 11/2003 | Kaneko ............... G03F 7/70066 355/53 |
| 6,850,642 B1 | 2/2005 | Wang |
| 9,819,880 B2 | 11/2017 | Hogasten et al. |
| 2003/0137593 A1 | 7/2003 | Watanabe et al. |
| 2009/0027545 A1 | 1/2009 | Yeo et al. |

(Continued)

FOREIGN PATENT DOCUMENTS

| JP | 2017-195442 A | 10/2017 |
| WO | 2010/111110 A1 | 9/2010 |

OTHER PUBLICATIONS

Extended European Search Report dated May 17, 2019 for the European Patent Application No. 18193462.1.
(Continued)

*Primary Examiner* — Tracy Y. Li

(74) *Attorney, Agent, or Firm* — Volpe Koenig

(57) ABSTRACT

A method and a system for filtering thermal image data. The method comprises: capturing thermal image data by a thermal image detector; forming a signal distribution of intensity values; identifying a first part in the signal distribution of intensity values, the first part being a peak having an intensity width equal to or smaller than a predetermined intensity span being based on a resolution parameter of the thermal image detector; identifying a second part having an intensity width larger than the predetermined intensity span; determining an intensity range between the first part and the second part; and filtering, if the intensity range is larger than a predetermined minimum intensity range, the thermal image data by excluding thermal image data forming part of the first part.

15 Claims, 6 Drawing Sheets

(56) References Cited

U.S. PATENT DOCUMENTS

| | | | |
|---|---|---|---|
| 2013/0131998 A1* | 5/2013 | Wright | G01N 30/8675 |
| | | | 702/27 |
| 2014/0168445 A1 | 6/2014 | Hogasten et al. | |
| 2015/0169980 A1 | 6/2015 | Matsuda et al. | |
| 2016/0155218 A1 | 6/2016 | Svensson et al. | |
| 2017/0069069 A1* | 3/2017 | Winzell | G06T 5/40 |

OTHER PUBLICATIONS

Chen et al, "Gray-level grouping (GLG): an automatic method for optimized image contrast enhancement—part II: the variations," in IEEE Transactions on Image Processing, vol. 15, No. 8, pp. 2303-2314, (Aug. 2006).

Kim et al., "Novel contrast enhancement scheme for infrared image using detail-preserving stretching." Optical Engineering—Opt Eng. 50(7), 077002 (Jul. 2011).

\* cited by examiner

METHOD AND SYSTEM FOR FILTERING THERMAL IMAGE DATA

FIELD OF INVENTION

The present teachings relate to a method for filtering thermal image data and a system for filtering thermal image data.

BACKGROUND

Objects with a temperature above absolute zero emit thermal radiation. The intensity and the spectral content of the emitted radiation varies with the temperature of the object. Typically, the intensity of the emitted radiation increases with increasing temperature of the object.

Thermal imaging systems utilize thermal sensors, such as micro-bolometers, to visualize heat differences within a scene by converting detected thermal energy into electrical energy to produce an image or a video of the scene. Thermal imaging systems are, moreover, advantageous to use, compared to imaging system utilizing visual light, as objects in a scene may be detected with or without illumination at the scene. Thermal imaging systems may further mitigate problems associated with complex light conditions such as when shadows or backlighting are present at the scene. Thermal imaging systems are thus frequently used in monitoring applications during day and night. Detection and/or identification of an object of interest in a scene may, however, be problematic to achieve. For example, a scene that includes objects with drastically different intensities, such as the sky having a different temperature than the ground, may, however, use up a large portion of the available intensity level range for the thermal images, such that only a small portion of the intensity level range is distributed over regions of interest in the scene, for example, vehicles, humans or buildings. Details in the scene and other objects of interest, may as a result be difficult to distinguish.

To this end, US 2014/0168445 A1 discloses techniques to process images to reduce consumption of an available output dynamic range by the sky in images. More specifically, a region or area in images that may correspond to the sky may be identified based on the location of the horizon in the images. A distribution of irradiance levels in the identified sky region is then analyzed to determine a dynamic range attributable to the sky region and a transfer function that compresses the dynamic range attributable to the sky region is generated such that the sky in the images may be suppressed.

This filtering of irradiance levels improves the imaging capability, but does, however, rely on a static identification of the sky region. The proposed method, moreover, requires image acquisition and potentially complex image analytics. There is, therefore, a need for simpler and more efficient methods for improving the imaging capability of thermal imaging systems. In particular, there is a need for improved techniques to improve the detection and/or identification capability of objects of interest in thermal images having regions that pertain to drastic differences in intensity from their surroundings. The imaging capability should, preferably, adapt to dynamic intensity changes within the scene.

SUMMARY

In view of the above, it is an object of the present teachings to provide a method and a system for filtering thermal image data. A further object of the present teachings is to allow exclusion of thermal image data pertaining to isolated regions in a scene depicted by a thermal imaging system. Improved detection and/or identification of an object of interest in the scene may thereby be obtained. Objects of interest may thereby be made more pronounced in the thermal image data. An improved imaging capability of the thermal imaging system is thus provided.

It is an object to mitigate, alleviate or eliminate one or more of the above-identified deficiencies in the art and disadvantages singly or in any combination and solve at least the above mentioned problems.

According to a first aspect, the above and other objects are achieved by a method for filtering thermal image data. The method comprises: capturing thermal image data by a thermal image detector; forming a signal distribution of intensity values from the thermal image data; identifying a first part in the signal distribution of intensity values, the first part being a peak having an intensity width equal to or smaller than a predetermined intensity span being based on a resolution parameter of the thermal image detector; identifying a second part of the signal distribution of intensity values, the second part having an intensity width larger than the predetermined intensity span; determining an intensity range between the first part and the second part; and filtering, if the intensity range is larger than a predetermined minimum intensity range, the thermal image data by excluding thermal image data forming part of the first part in the signal distribution of intensity values.

By means of the present method it is possible to exclude isolated regions from the thermal image data, and thereby reducing a total intensity level range in the thermal image data.

The wording "signal distribution of intensity values" should be construed as a distribution in which the number of pixels is distributed according to intensity. In a graphical representation of the signal distribution of intensity values, a horizontal axis may represent intensity and a vertical axis may represent number of pixels corresponding to a given intensity value or intensity values. Such a representation is also known as a histogram.

The wording "resolution parameter" should be construed as an accuracy with which the thermal image detector is able to determine intensity of incoming radiation.

The wording "signal strength response parameter" is related to a parameter of conversion of incoming radiation on the thermal image detector into an electrical signal.

The wording "intensity range" should be construed as a difference between an intensity value defining an intensity position of a part of the signal distribution to another intensity value defining an intensity position of another part of the signal distribution. For example, the intensity value defining the intensity position of the first part may be an intensity value at which the first part has its peak signal strength, and the intensity value defining the intensity position of the second part may be an intensity value at which the second part has a signal strength higher than a predetermined threshold signal value. A skilled person realizes that there is a plurality of different intensity values that may be used to define the intensity position of the first part and the second part, respectively. For instance, the intensity position of a part may be based on an accumulated area of the part, such that an intensity value at which the accumulated area of the part is at a predetermined threshold area defines the intensity position of the part.

The wording "predetermined minimum intensity range" should be construed as a minimum intensity range by which the first part must be separated from the second part in order for the method to exclude thermal image data forming part of the first part.

The wording "excluding thermal image data forming part of the first part" should be construed as excluding, at least partly, thermal image data forming part of the first part. In other words, it is not needed for all thermal image data forming part of the first part to be fully excluded, as a reduction of the thermal image data may be beneficial.

The wording "peak" should be construed as a portion of the signal distribution of intensity values, which has an intensity width equal to or smaller than a predetermined intensity span.

According to the present method, a thermal image detector captures thermal image data. The thermal image detector may comprise a cooled thermal image detector or an uncooled thermal image detector. The thermal image detector may comprise a microbolometer. The thermal image detector may be a thermal camera. The thermal image data may pertain to a scene depicted by the thermal image detector. The thermal image detector may capture an image of a scene. The image may be based on the thermal image data.

According to the present method, a signal distribution of intensity values is formed from the thermal image data.

An advantage of forming a signal distribution of intensity values from the thermal image data may be to identify isolated intensities in the thermal image data.

According to the present method, a first part is identified in the signal distribution of intensity values. The first part is a peak having an intensity width equal to or smaller than a predetermined intensity span being based on a resolution parameter of the thermal image detector. In other words, the thermal image data comprises a number of pixels with a spread in intensity values.

The first part in the signal distribution of intensity values may be related to thermal image data pertaining to a sky, and/or reflections thereof, comprised in the scene captured by the thermal image detector. The first part in the signal distribution of intensity values may be related to thermal image data pertaining to a sun, and/or reflections thereof, comprised in the scene captured by the thermal image detector. The intensity width of the first part may be the full width at half maximum of the first part. The maximum of the first part may be a maximum pixel number of an intensity value. For instance, thermal image data comprising an object of homogenous temperature may have a large number of pixels with a small spread in intensity values, and thereby may be manifested as a peak in a formed signal distribution of intensity values from the thermal image data. The width of the peak in the signal distribution of intensity values relates to the resolution parameter of the thermal image detector.

A person skilled in the art realizes that the peak in the signal distribution of intensity values may be a dip in the signal distribution of intensity values, depending on how the signal distribution of intensity values is formed. For example, a peak in a signal distribution of intensity values may be a clip in an inverse of the same signal distribution of intensity values.

An advantage of identifying a first part being a peak having an intensity width equal to or smaller than a predetermined intensity span may be that thermal image data pertaining to objects of a homogenous temperature are identified. It is also advantageous that thermal image data pertaining to multiple objects having a similar temperature may be identified. For example, thermal image data pertaining to a plurality of objects having the same temperature may form part of a single peak in the signal distribution of intensity values. Features having a homogenous temperature may further be excludes as will be described below.

According to the present method, an intensity range between the first part and the second part is determined.

According to the present method, the thermal image data is filtered by excluding thermal image data forming part of the first part in the signal distribution of intensity values, if the intensity range is larger than a predetermined minimum intensity range. Thus, thermal image data forming part of the first part is excluded if an intensity value, at which the first part is positioned, is further from the second part than the predetermined minimum intensity range. The predetermined minimum intensity range may be based on a response of the thermal image detector.

This is advantageous since it may exclude isolated intensity areas in the thermal image data. For example, thermal image data pertaining to a sky or a sun may typically be identified as a peak, and it may therefore be possible to exclude, or at least reduce, thermal image data pertaining to the sky or the sun comprised in a scene depicted by the thermal image detector. It may also be possible to exclude, or at least reduce, thermal image data pertaining to reflections of the sky or the sun, for example reflections in a window or a lake, comprised in a scene depicted by the thermal image detector independently of where in the image the reflections are located. Hence, the available (and limited) intensity levels of the thermal image may be distributed to a higher degree over interesting regions of the image. These regions may correspond to people, vehicles, buildings, etc. which are typical examples of objects that are important to distinguish from a monitoring perspective. In other words, the filtered thermal image data is therefore reduced, and may be distributed over available, and limited, intensity levels of the thermal image. By the present method, no preceding analysis of the thermal image is needed for filtering the thermal image data. It should be noted that the method described does therefore not rely on a filtering procedure which is based on a determined position of the dominating objects in the scene. By way of example, no determination of the position of the horizon and/or the sun in a thermal image obtained by the thermal imaging system is required prior to the filtering. Further, reflections of the sky or the sun may be filtered from the thermal image data, independently of their positions in the scene. For example, reflections of the sky or the sun positioned below the horizon may be filtered by the present method. A more versatile filtering method is therefore provided.

The predetermined minimum intensity range may be based on a signal strength response parameter of the thermal image detector.

Basing the predetermined minimum intensity range on the response parameter is advantageous since the response parameter may be different for different thermal image detectors. In other words, different predetermined minimum intensity ranges may be used for different thermal image detectors. For example, for a higher response of the thermal image detector, a larger predetermined minimum intensity range may be set, and for a lower response of the thermal image detector, a smaller predetermined minimum intensity range may be set.

The intensity range between the first part and the second part may be determined from the peak to a threshold intensity. The threshold intensity may be set at an intensity value where the signal strength in the second part of the signal distribution of intensity values is at a threshold signal level. The threshold signal level may be a predetermined signal strength.

An advantage is that the threshold intensity may be set at an intensity value where the signal strength of the signal distribution of intensity values is equal to or larger than the predetermined signal strength. A further advantage is that the threshold intensity may be set at an intensity value where the signal strength of the signal distribution of intensity values is equal to or larger than a noise level in the signal distribution of intensity values.

The method may further comprise: forming a second signal distribution of intensity values from the filtered thermal image data; rescaling the filtered thermal image data; and forming a third signal distribution of intensity values from the rescaled filtered thermal image data, the third signal distribution of intensity values spanning an intensity level range larger than an intensity level range of the second signal distribution of intensity values. In other words, the filtered thermal image data may be rescaled such that the intensity level range of the third signal distribution of intensity values is larger than the intensity level range of the second signal distribution of intensity values.

An advantage of rescaling the thermal image data is that a contrast in at least a portion, for example, a region of interest (ROI), of the scene captured by the thermal image detector may be enhanced.

It should be noted that "the signal distribution" may here alternatively be referred to as "the first signal distribution" to clarify the order of the respective signal distributions.

The signal strength response parameter may be temperature dependent, and the method may further comprise: determining a temperature of the thermal image detector; and setting the predetermined minimum intensity range based on the determined temperature of the thermal image detector.

An advantage is that the predetermined minimum intensity range may be adjusted depending on the temperature of the thermal image detector.

The resolution parameter may be temperature dependent, and the method may further comprise: determining a temperature of the thermal image detector; and setting the predetermined intensity span based on the determined temperature of the thermal image detector. The predetermined intensity span may therefore be adjusted for changes in temperature of the thermal image detector.

This may be advantageous since the peak in the signal distribution of intensity values may be identified depending on the temperature of the thermal image detector. In other words, a maximum width that the peak is allowed to have may be adjusted depending on the temperature of the thermal image detector.

The predetermined intensity span may be a predetermined multiple of the resolution parameter.

The signal distribution of intensity values may be a histogram of the thermal image data. In case the signal distribution of intensity values is a histogram, the rescaling of the filtered thermal image data may comprise stretching the histogram of the filtered thermal image data.

The intensity width of the first part may be equal to the width of the first part at a predetermined fraction of a maximum value of the first part.

The resolution parameter may be a signal-to-noise figure of the thermal image detector.

The signal-to-noise figure may be a noise equivalent temperature difference (NETD) of the thermal image detector.

An advantage of the signal-to-noise figure being a NETD of the thermal image detector may be that it enables a simpler implementation, since the NETD of the thermal image detector is typically known prior to implementation. An advantage of the resolution parameter being a signal-to-noise figure or a NETD of the thermal image detector is that the predetermined intensity span may be based on the signal-to-noise figure or NETD of the thermal image detector instead of on an evaluation of the signal distribution of intensity values. In other words, the predetermined intensity span may be set prior to evaluating the signal distribution of intensity values. Therefore, the width of the peak in the signal distribution of intensity values may be compared to a predetermined intensity span that is based on a parameter (signal-to-noise figure or NETD) of the thermal image detector, instead of having to evaluate the signal distribution of intensity values to determine prior to comparing the width of the peak with the predetermined intensity span. A less complex evaluation (e.g., in terms of processing time) may thus be enabled.

The method may further comprise: identifying a further part in the signal distribution of intensity values, the further part being a further peak having an intensity width equal to or smaller than a further predetermined intensity span being based on the resolution parameter of the thermal image detector; determining a further intensity range between the second part and the further part; and filtering, if the further intensity range is larger than a further predetermined minimum intensity range, the thermal image data by excluding thermal image data forming part of the further part in the signal distribution of intensity values.

In other words, the thermal image data may further comprise a number of pixels with a small spread in intensity values. The further part in the signal distribution of intensity values may be related to thermal image data pertaining to a sky, and/or reflections thereof, comprised in the scene captured by the thermal image detector. The further part in the signal distribution of intensity values may be related to thermal image data pertaining to a sun, and/or reflection thereof, comprised in the scene captured by the thermal image detector. The intensity width of the further part may be equal to the full width at half maximum of the further part. The maximum of the further part may be a maximum pixel amount of an intensity value. A person skilled in the art realizes that the further peak in the signal distribution of intensity values may be a further dip in the signal distribution of intensity values, depending on how the signal distribution of intensity values is formed. For example, a further peak in a signal distribution of intensity values may be a further dip in an inverse of the same signal distribution of intensity values.

The further predetermined minimum intensity range may be based on the signal strength response parameter of the thermal image detector. The further intensity range may be determined from the intensity value defining an intensity position of the second part and an intensity value defining an intensity position of the further part. A skilled person realizes that there is a plurality of different intensity values that may be used to define the intensity position of the further p art.

This may be advantageous since thermal image data forming part of the additional peak in the signal distribution of intensity values may be excluded or, at least, reduced.

The method may further comprise: generating an image based on the rescaled and/or filtered thermal image data.

The method may therefore comprise capturing a first image comprising the thermal image data, and thereafter filtering of the thermal image data as described above. The method may further generate an image based on the filtered thermal image data. Detection and/or identification of an object of interest in the scene may thereby be made easier in the filtered thermal image. An improved contrast in the filtered thermal image may further be obtained.

The method may further comprise one or more acts chosen from the group consisting of: auto-gaining the rescaled and/or filtered thermal image data; and equalizing the rescaled and/or filtered thermal image data.

For example, the raw thermal image data may have an intensity level range of 14 bit. The filtered and/or rescaled thermal image data, resulting from an application of the present method on the raw thermal image data, may, after auto-gaining the filtered and/or rescaled thermal image, have an intensity level range of 12 bit. The auto-gained thermal image data may be equalized to an intensity level range of 8 bit. It is to be understood that the actual intensity level ranges may be different. For example, the thermal image data may initially have an intensity level range of 16 bit instead of 14 bit.

According to a second aspect the present disclosure relates to a system comprising: a thermal image detector configured to capture thermal image data; a circuitry configured to: form a signal distribution of intensity values from the thermal image data; identify a first part in the signal distribution of intensity values, the first part being a peak having an intensity width equal to or smaller than a predetermined intensity span being based on a resolution parameter of the thermal image detector; identify a second part of the signal distribution of intensity values, the second part having an intensity width larger than the predetermined intensity span; determine an intensity range between the first part and the second part; and filter, if the intensity range is larger than a predetermined minimum intensity range being based on a signal strength response parameter of the thermal image detector, the thermal image data by excluding thermal image data forming part of the peak in the signal distribution of intensity values.

The system may further comprise a camera. The system may be comprised in a camera. The thermal image data may pertain to an image captured by the system.

The circuitry may comprise a processing unit and/or a memory.

The circuitry may further be configured to generate an image of the thermal image data. The circuitry may further be configured to auto-gain the filtered thermal image data, and/or equalizing the filtered thermal image data.

In other words, the system is adapted to capture thermal image data pertaining to a scene and filter thermal image data by excluding thermal image data forming part of the peak.

The predetermined minimum intensity range may be based on a signal strength response parameter of the thermal image detector.

The circuitry may be further configured to: identify a further part in the signal distribution of intensity values, the further part being a further peak having an intensity width equal to or smaller than a further predetermined intensity span being based on a resolution parameter of the thermal image detector; determine a further intensity range between the second part and the further part; and filter, if the further intensity range is larger than a further predetermined minimum intensity range, the thermal image data by excluding thermal image data forming part of the further part in the signal distribution of intensity values. In other words, the circuitry may filter the thermal image data by excluding thermal image data forming part of the first part in the signal distribution of intensity values and the further part in the signal distribution of intensity values. The further predetermined minimum intensity range may be based on the signal strength response parameter of the thermal image detector. The circuitry may be further configured to generate an image based on the filtered thermal image data.

The above mentioned features and advantages of the method, when applicable, apply to this second aspect as well. In order to avoid undue repetition, reference is made to the above.

According to a third aspect, the present disclosure relates to a non-transitory computer readable storing medium having stored thereon a program for implementing the present method when executed on a device having processing capabilities. The above mentioned features and advantages of the method, when applicable, apply to this fourth aspect as well. In order to avoid undue repetition, reference is made to the above.

A further scope of applicability of the present disclosure will become apparent from the detailed description given below. However, it should be understood that the detailed description and specific examples, while indicating preferred variants of the present teachings, are given by way of illustration only, since various changes and modifications within the scope of the present teachings will become apparent to those skilled in the art from this detailed description.

Hence, it is to be understood that the present teachings are not limited to the particular steps or acts of the methods described or component parts of the systems described as such method and system may vary. It is also to be understood that the terminology used herein is for purpose of describing particular embodiments only, and is not intended to be limiting. It must be noted that, as used in the specification and the appended claim, the articles "a", "an", "the", and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings do not exclude other elements, steps or acts.

BRIEF DESCRIPTION OF THE DRAWINGS

The above and other aspects of the present teachings will now be described in more detail, with reference to appended drawings showing variants of the present teachings. The figures should not be considered limiting the present teachings to the specific variant; instead, they are used for explaining and understanding the present teachings.

As illustrated in the figures, the sizes of layers and regions are exaggerated for illustrative purposes and, thus, are provided to illustrate the general structures of variants of the present teachings. Like reference numerals refer to like elements throughout.

DETAILED DESCRIPTION OF THE PREFERRED EMBODIMENTS

The present teachings will now be described more fully hereinafter with reference to the accompanying drawings, in which currently preferred variants of the present teachings are shown. The present teachings may, however, be implemented in many different forms and should not be construed as limited to the variants set forth herein; rather, these variants are provided for thoroughness and completeness, and fully convey the scope of the present teachings to the skilled person.

Figure 1A:
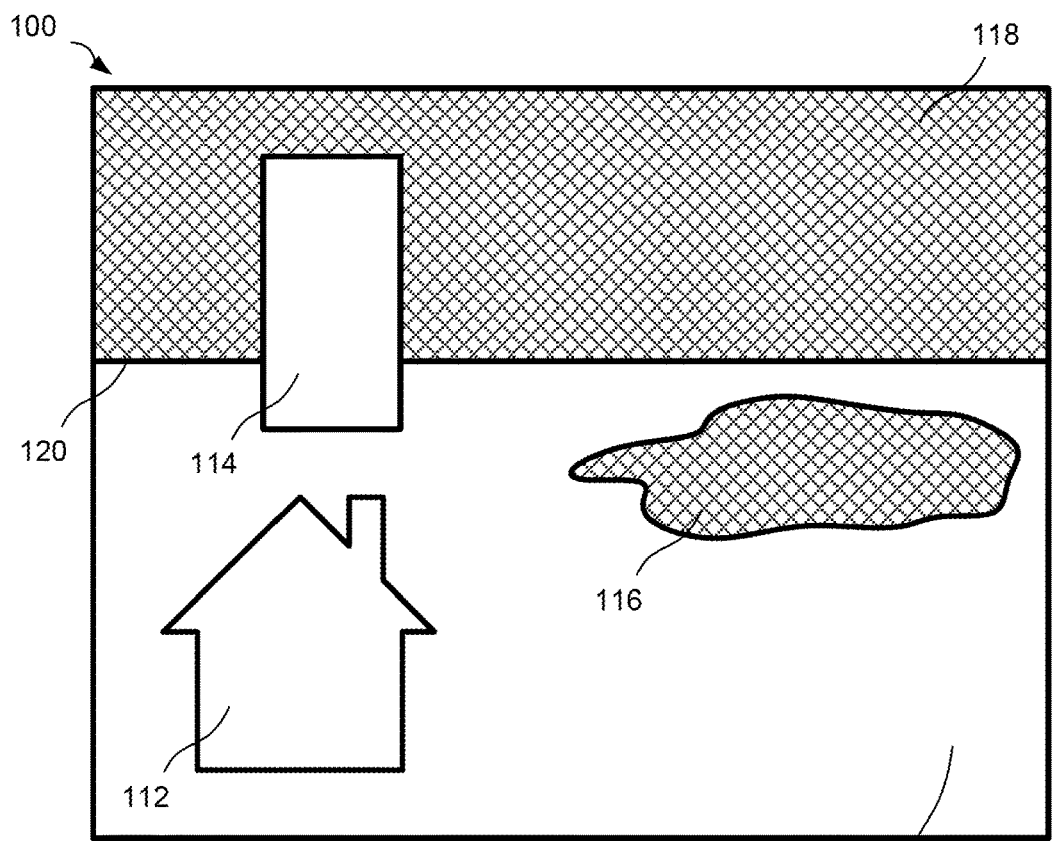
FIG. 1A illustrates an image generated from thermal image data.

FIG. 1A illustrates an image 100 generated from thermal image data. The thermal image data is captured by a thermal image detector. The image 100 comprises a first structure 112, a second structure 114, and a lake 116. The ground 117 and the sky 118 are also visible in the image 100. The second structure 114 extends above a horizon 120 in the scene. In the image 100, the sky 118 is reflected in the lake 116. Features for example within or close by the first structure 112, the second structure 114, the lake 116, and the sky 118 are not visible in the image 100, since intensities pertaining to such features spans a small intensity range compared to a total intensity range that is available for imaging the thermal image data. In other words, the intensities pertaining to the features obtains the same intensity value in the image and is thus not distinguishable from each other. Going more into detail, a digital image generated from the thermal image data is represented by a set number of intensity levels. An intensity scale with 256 intensity level may be used in the generated digital image. Each pixel in the digital image is associated with an intensity level. The intensity range of the thermal image data is distributed over the set number of intensity levels. Consequently, detailed features in the image are hidden in the image 100 due to the large differences in temperature that the image data contains.

The thermal image data may comprise more intensity levels than the generated digital image. For instance, the thermal image data may have 16384 intensity levels (14 bit), while the generated digital image may have 256 intensity levels (8 bit). Thus, the intensity level range may decrease during the image processing of the thermal image data. It is to be understood that the number of intensity levels are examples only, and other numbers of intensity levels are possible.

Figure 1B:
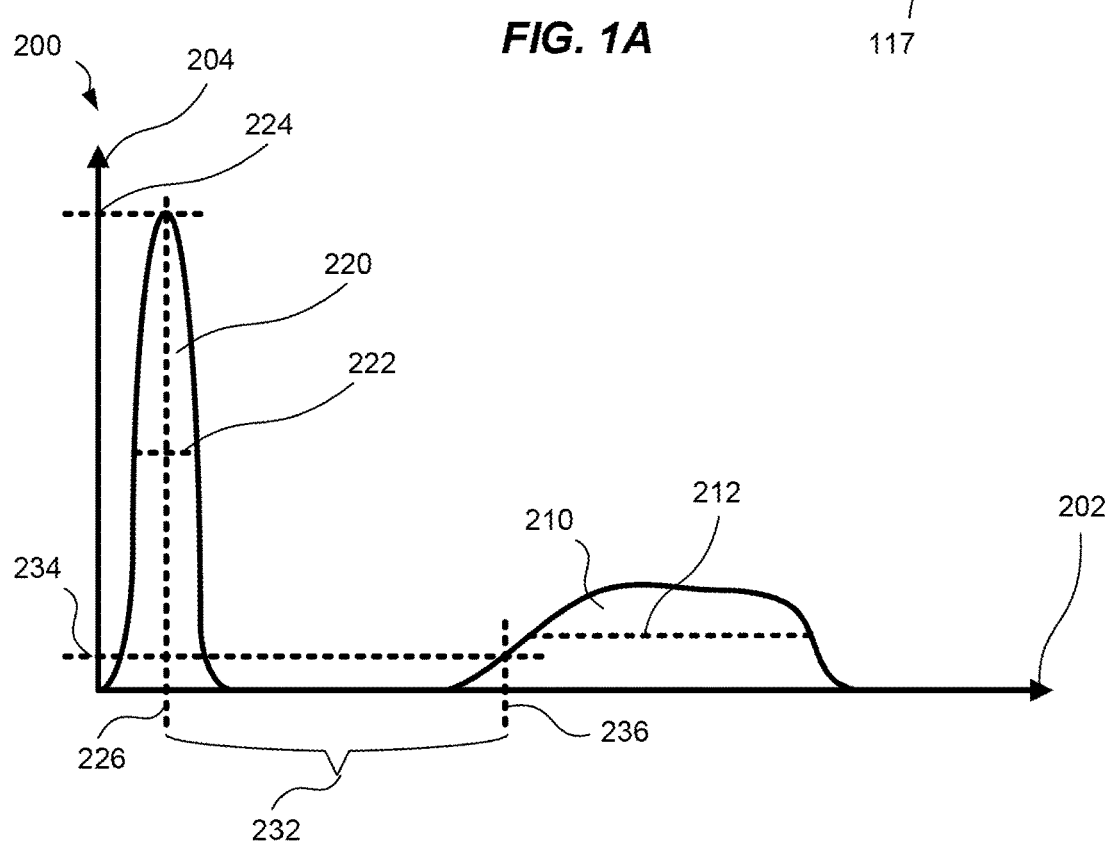
FIG. 1B is a diagram of a formed signal distribution of intensity values from thermal image data.

FIG. 1B is a diagram 200 of a formed signal distribution of intensity values from the thermal image data illustrated in FIG. 1A as an image 100. In the diagram 200 of the signal distribution of intensity values, a first part 220 and a second part 210 are visible. The formed signal distribution in FIG. 1B is cropped, and thermal image data having intensities lower than the intensities comprised in the formed signal distribution have therefore been excluded. In other words, the thermal image data pertaining to the image 100 in FIG. 1A may comprise more thermal image data than what is shown in the formed signal distribution in FIG. 1B. The signal distribution may alternatively be formed as a histogram of the thermal image data.

The second part 210 represents thermal image data pertaining to the first structure 112 and the second structure 114 shown in the image 100. The first part 220 represents thermal image data pertaining to the sky 118 and reflections of the sky 118 in the lake 116. In the diagram 200, the horizontal axis 202 represents intensity, and the vertical axis 204 represents number of pixels. It is to be understood that an intensity value at which the vertical axis 204 is positioned is not necessarily 0.

The first part 220 in the diagram 200 is, based on the definition provided in this application, identified as a peak, since an intensity width 222 of the first part 220 is (equal to or) smaller than a predetermined intensity span. In the following, the first part 220 will therefore be referenced to as the peak 220. The second part 210 in the diagram 200 is within the content of this application not to be identified as a peak, since an intensity width 212 of the second part 210 is larger than the predetermined intensity span. In the example shown in FIG. 1B, the intensity widths 212, 222 are the intensity widths at a half-maximum of the signal pertaining to the first part 220 and the second part 210, respectively. However, widths with other definitions may be used to define the intensity widths 212, 222. For instance, each intensity width 212, 222 may be based on an extent of respective part 210, 220 at a predetermined fraction of a maximum value of respective part 210, 220.

The predetermined intensity span is based on a resolution parameter of the thermal image detector that captured the thermal image data. The resolution parameter may, for instance, be a signal-to-noise figure of the thermal image detector. An example of a relevant signal-to-noise figure may be a noise equivalent temperature difference (NETD) of the thermal image detector. For instance, the predetermined intensity span may be a predetermined multiple of the resolution parameter. The resolution parameter of the thermal image detector may be temperature dependent, and the predetermined intensity span may be set based on a determined temperature of the thermal image detector.

In the diagram 200, a predetermined signal strength 234 has been set. At an intensity value where the signal strength of the second part 210 of the signal distribution of intensity values, which is not part of the peak 220, is equal to the predetermined signal strength 234, an intensity position 236 of the second part 210 is set. In other words, the intensity position 236 of the second part 210 is set at an intensity value where the signal strength, excluding the signal pertaining to the peak 220, is equal to the predetermined signal strength 234. Alternatively, the intensity position 236 of the second part 210 may be set at an intensity value at which the signal strength pertaining to the intensity value is larger than the predetermined signal strength 234. It is to be understood that there is a plurality of different ways to define the intensity position 236 of the second part 210.

In the diagram 200, an intensity position 226 of the peak 220 is defined as an intensity value at which the peak 220 has its peak value 224. Based on the intensity position 226 of the peak 220 and the intensity position 236 of the second part 210, an intensity range 232 is determined as the difference between the intensity position 226 of the peak 220 and the intensity position 236 of the second part 210.

In the example shown in FIG. 1B, the intensity range 232 is larger than a predetermined minimum intensity range. In this example, the predetermined minimum intensity range is based on a signal strength response parameter of the thermal image detector. In accordance with the present teachings, since the intensity width 222 of the peak 220 is smaller than the predetermined intensity span, and since the intensity range 232 is larger than the predetermined minimum intensity range, it is beneficial to filter the thermal image data by excluding thermal image data forming part of the peak 220 in the signal distribution of intensity values. In other words, image data pertaining to the sky 118, and reflections thereof, is identified according to the present teachings (based on peak width and intensity distance to other image data) and removed, or at least reduced, from the thermal image data. Thus, a higher intensity resolution for the remaining image data pertaining to interesting features of the image 100, for example, the first and second structures 112, 114, the lake 116 and detailed features thereof, may be achieved.

It should be noted that there are alternative ways on how the implement the determination of the intensity range. For example, one way to determine an intensity difference is to accumulate the area below the signal distribution in the diagram 200, corresponding to accumulated number of pixels starting from an intensity position (e.g., the intensity position 226) of the peak 220. If the accumulated area does not exceed a predetermined area threshold when the number of pixels of a predetermined minimum intensity range (starting from the intensity position of the peak) have been accumulated, it is determined that the intensity range is larger than the predetermined minimum intensity range.

Another option of the determination of the intensity range relative the predetermined minimum intensity range is to determine the intensity range as a difference in intensity between an intensity position of a peak to the nearest intensity position at which the number of pixels is above a predetermined threshold. The nearest intensity position may be determined by stepwise evaluating the number of pixels for each intensity starting from the intensity position of the peak. When the number of pixels goes above the predetermined threshold, the intensity range may be determined as the intensity distance between that position and the intensity position of the peak and it can then be determined if the determined intensity range is larger than the predetermined minimum intensity range.

Figure 1C:
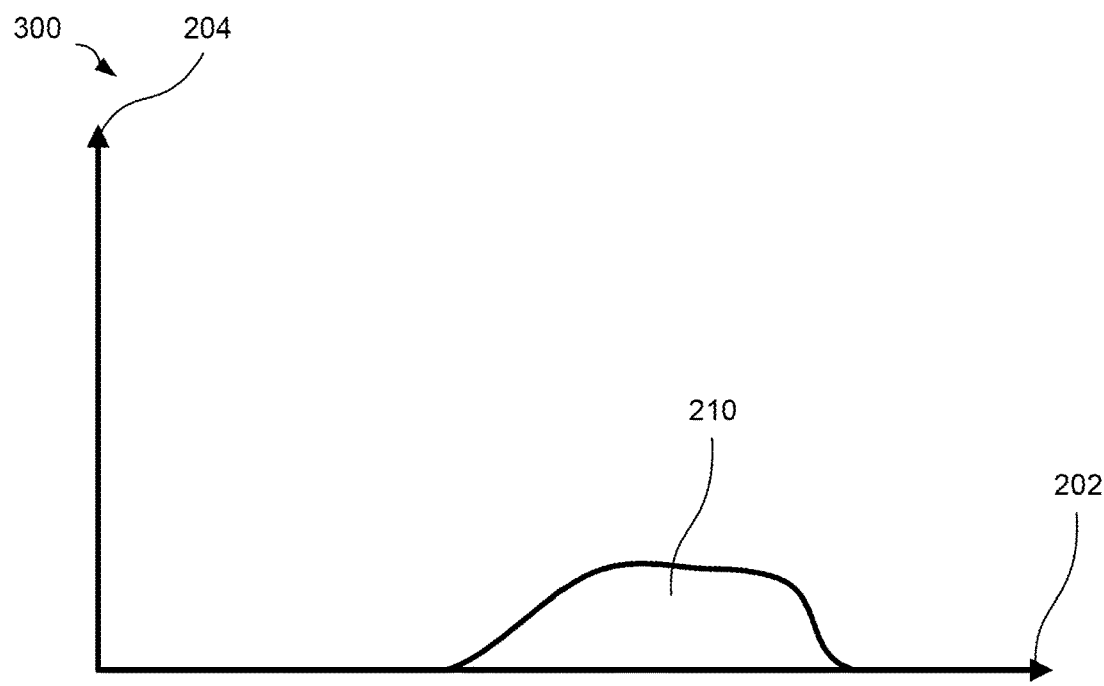
FIG. 1C is a diagram of a formed signal distribution of intensity values from filtered thermal image data.

A diagram 300 of a second formed signal distribution of intensity values from the filtered thermal image data is shown in FIG. 1C. As is seen in the diagram 300, the peak 220 in FIG. 1B has been excluded by removal. The second part 210, not identified as a peak, is, however, still present in the second signal distribution of intensity values.

Figure 1D:
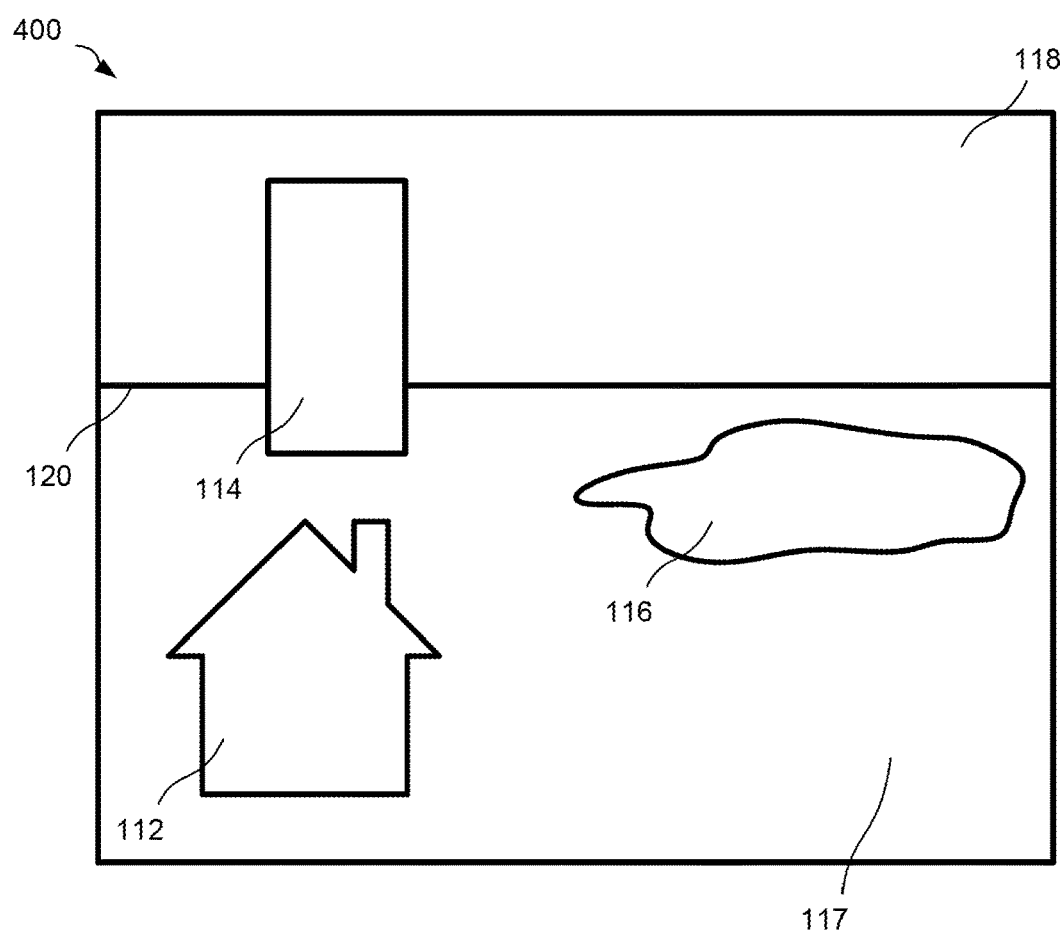
FIG. 1D illustrates an image generated from filtered thermal image data.

FIG. 1D illustrates an image 400 generated from the filtered thermal image data. In the image 400, it is seen that image data pertaining to the lake 116 and the sky 118 have been excluded from the thermal image data, which is not the case for the corresponding parts 116, 118 in the unfiltered image 100. In other words, part(s) of the signal pertaining to the lake 116 and the sky 118 in the unfiltered image 100 has been excluded in the image 400 by excluding thermal image data forming part of the peak 220 in the signal distribution of intensity values. When generating the image 400, the filtered thermal image data may be auto-gained and/or equalized. The thermal image data may after the filtering be rescaled.

Figure 2A:
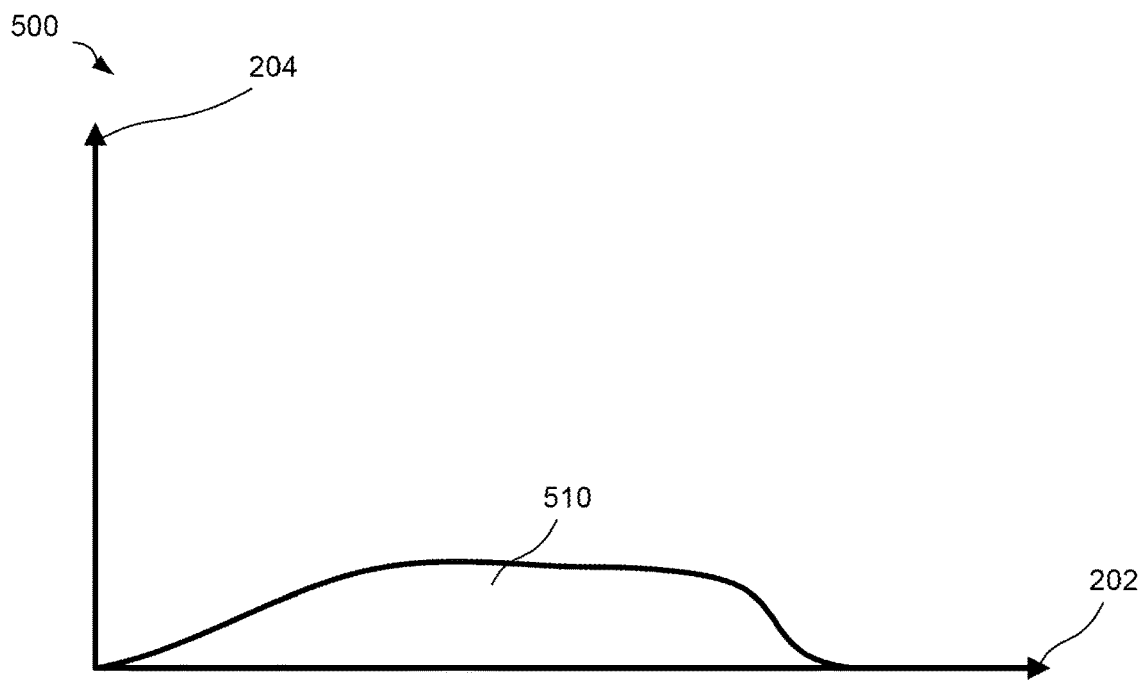
FIG. 2A is a diagram of a formed signal distribution of intensity values from filtered and rescaled thermal image data.
Figure 2B:
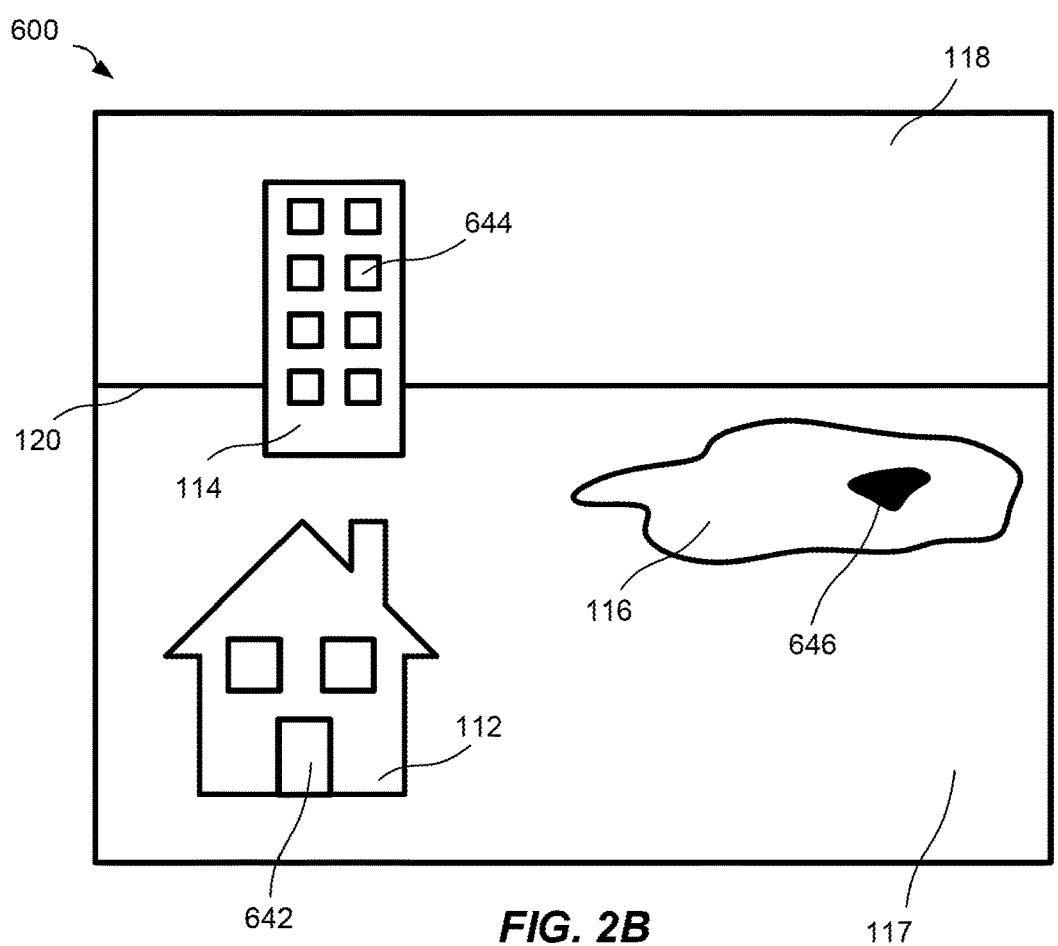
FIG. 2B illustrates an image generated from filtered and rescaled thermal image data.

FIG. 2A is a diagram 500 of a third formed signal distribution of intensity values from the rescaled filtered thermal image data. In the example shown in FIG. 2A, the filtered thermal image data has been rescaled (e.g., by contrast stretching) such that an intensity level range of the third signal distribution of intensity values is larger than an intensity level range of the second signal distribution of intensity values in the diagram 300 illustrated in FIG. 1C. Also, in the specific example illustrated in FIG. 2A, the intensity level range of the third signal distribution of intensity values is similar to an intensity level range of the signal distribution of intensity values shown in diagram 200 illustrated in FIG. 1B. However, the intensity level range of the third signal distribution of intensity values may be different from the intensity level range of the signal distribution of intensity values in FIG. 1B. It is preferred that the thermal image data is rescaled such that the intensity level range of the third signal distribution of intensity values enhances a contrast of the rescaled thermal image data. This is exemplified in FIG. 2B, where an image 600 generated from the filtered and resealed thermal image data is illustrated. Comparing FIG. 2B with FIGS. 1A and 1D, it may be seen that features 642, 644, 646 that are not seen in the unfiltered image 100, becomes distinguishable after the resealing, since the contrast of the thermal image data has been enhanced by excluding the thermal image data representing the peak 220 from the captured thermal image data. The features 642, 644, 646 are not seen in the unfiltered image 100, since the set number of intensity levels of the image 100 spans the intensities of the unfiltered thermal image data, thus having only a small number of intensity levels representing the features 642, 644, 646. The filtered thermal image data, however, comprises a smaller intensity range than the unfiltered thermal image data, and the set number of intensity levels of the image 100 therefore spans fewer intensities. Thus, there is a larger number of intensity levels representing the features 642, 644, 646 in the image 600 generated from the filtered and resealed thermal image data. The available intensity level range of the digital image 600 can thereby be applied to the second part 210 of the signal distribution, and thus be rescaled to a rescaled part 510 as shown in FIG. 2A. In other words, by filtering and resealing the thermal image data, interesting features, for example, features 642, 644, 646, become visible due to the enhanced contrast in the image 600.

Figure 3A:
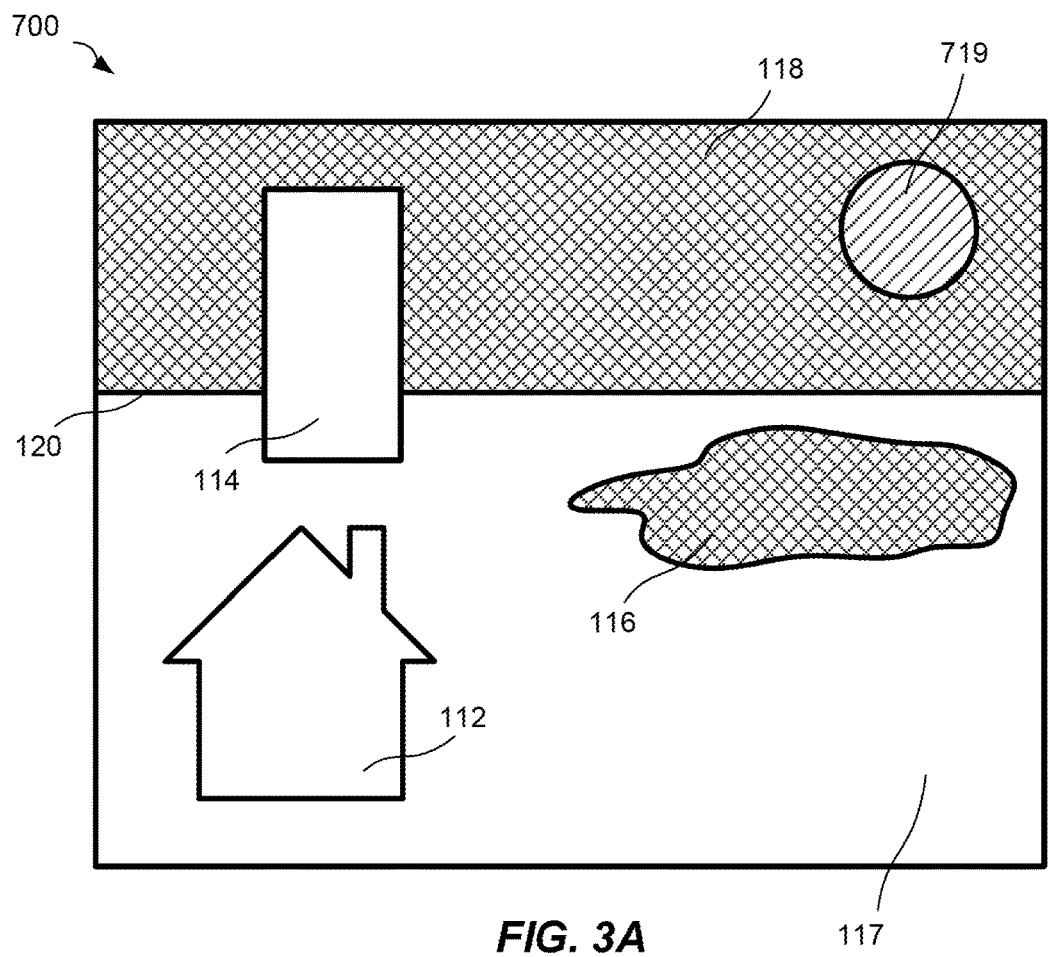
FIG. 3A illustrates a thermal image generated from thermal image data.

In FIG. 3A, an image 700 similar to the image 100 in FIG. 1A is illustrated with the difference that a sun 719 is also comprised in the scene. The other features are the same in both images 100, 700. The diagram 800 shown in FIG. 3B results from forming a signal distribution of intensity values from thermal image data pertaining to the scene of image 700. In the diagram 800, a first part 220, a second part 210, and a third part 850 are visible. Comparing FIG. 1B and FIG. 3B, it is realized that a difference between the two diagrams 100, 800 is the third part 850. An evaluation of the first part (peak) 220 and the second part 210 is similar to the description of FIG. 1B and will not be repeated here. However, it is to be understood that the evaluation of the first part 220 will reach the same result as described earlier in relation to FIG. 1B. Thus, the first part 220 will be referenced to as the first peak 220. Hence, the thermal image data may be filtered by excluding thermal image data forming part of the first peak 220 in the signal distribution of intensity values. Below, the evaluation of the third part 850 will be described.

Figure 3B:
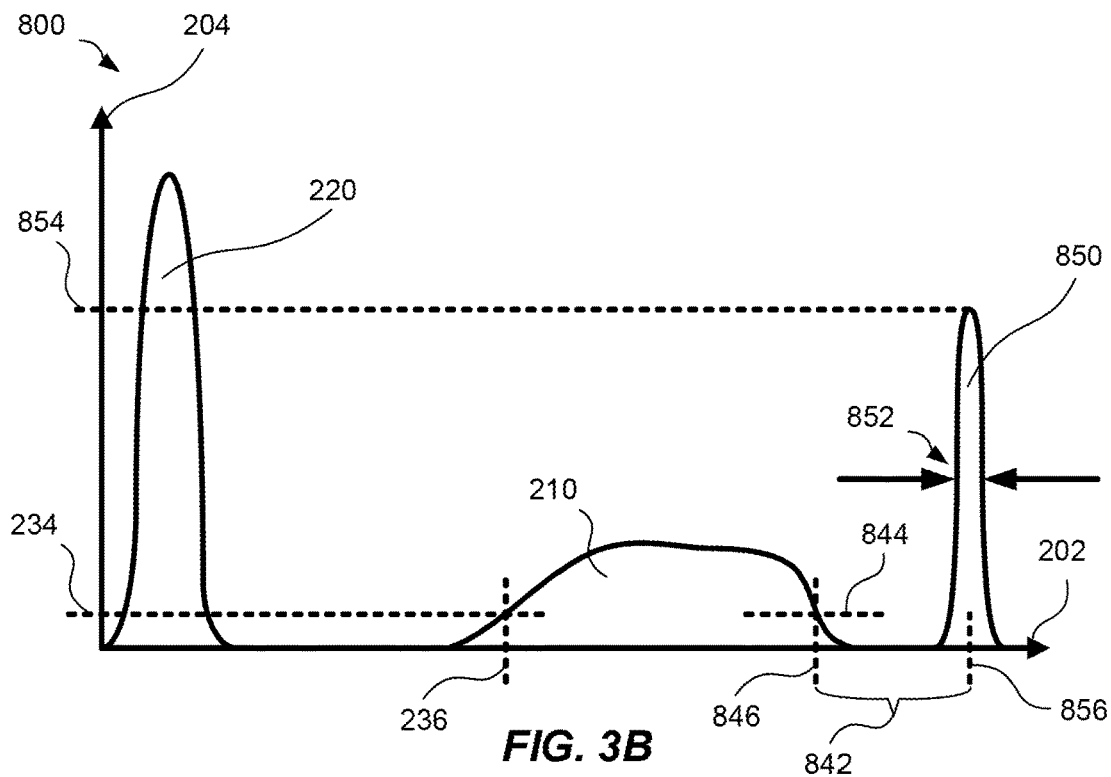
FIG. 3B is a diagram of a formed signal distribution of intensity values from thermal image data.

The third part 850 in FIG. 3B is identified as a further peak, since its intensity width 852 is smaller than a further predetermined intensity span. In the example shown in FIG. 3B, the intensity width 852 of the third part 850 is an intensity width at a half-maximum of the signal pertaining to the third part 850. The further predetermined intensity span may be the same as the predetermined intensity span relating to FIG. 1B or, alternatively, be different from the predetermined intensity span relating to FIG. 1B. In either case, the further intensity span is based on the resolution parameter of the thermal image detector that captured the thermal image data. In the following, the third part 850 will be referenced to as the second peak 850.

A further predetermined signal strength 844 has been set in the diagram 800. As is seen in FIG. 3B, the further predetermined signal strength 844 is the same signal strength as the predetermined signal strength 234. However, the predetermined signal strength 234 and the further predetermined signal strength 844 may, in other variants, be different. At an intensity value where the signal strength of a part of the signal distribution of intensity values, which is neither part of the first peak 220 nor the second peak 850, is at the further predetermined signal strength 844, a further intensity position 846 of the second part 210 is set. In other words, the further intensity position 846 of the second part 210 is set at an intensity value where the signal strength, when disregarding the signal pertaining to the first peak 220 and the second peak 850, is at the further predetermined signal strength 844.

In FIG. 3B, an intensity position 856 of the second peak 850 is defined as an intensity value at which the second peak 850 has its peak value 854. From the intensity position 856 of the second peak 850 and the further intensity position 846 of the second part 210, a further intensity range 842 is determined as the difference in intensity between the intensity position 856 and the further intensity position 846 of the second part. In the example shown in FIG. 3B, the further intensity range 842 is larger than a further predetermined minimum intensity range. In this example, the further predetermined minimum intensity range is different from the predetermined minimum intensity range. In other examples, the further predetermined minimum intensity range may be the same as the predetermined minimum intensity range. However, in this example, the predetermined minimum intensity range and the further predetermined minimum intensity range are both based on the signal strength response parameter of the thermal image detector. In a further embodiment, different predetermined minimum intensity range values may be chosen depending on if an identified peak represents higher or lower intensities relative an identified part that is not identified as a peak (e.g., the second part 210 in the example of FIG. 3B).

Returning to FIG. 3B, and according to the present teachings, since the intensity width 852 of the second peak 850 is smaller than the further predetermined intensity span, and the further intensity range 842 is larger than a further predetermined minimum intensity range, thermal image data is filtered by excluding thermal image data forming part of the first peak 220 and the second peak 850 in the signal distribution of intensity values.

Figure 3C:
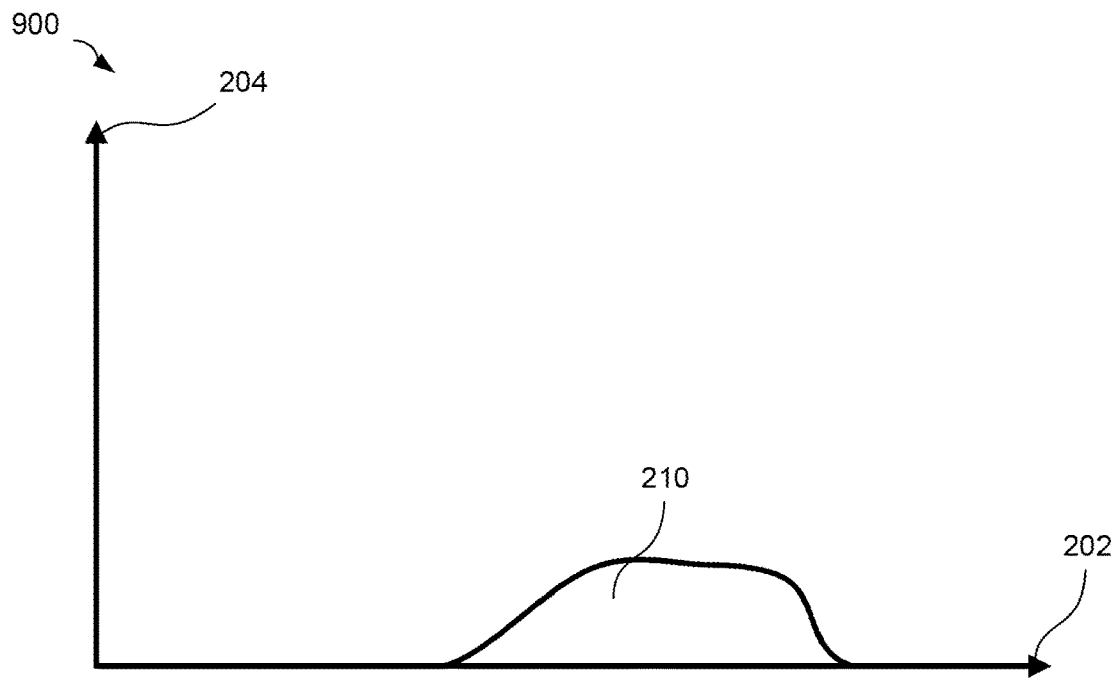
FIG. 3C is a diagram of a formed signal distribution of intensity values from filtered thermal image data.

In FIG. 3C, a diagram 900 illustrating a fourth signal distribution of intensity values formed from the filtered thermal image data, where the thermal image data forming part of the first peak 220 and the second peak 850 in the signal distribution of intensity values have been excluded by removal. As is seen in FIG. 3C, the fourth signal distribution of intensity values is similar to the second signal distribution of intensity values shown in FIG. 1C. The thermal image data pertaining to the fourth signal distribution of intensity values may further be resealed in the same manner as described in relation to FIG. 2A, and an image may be generated as described in relation to FIG. 1D and FIG. 2B.

Figure 4:
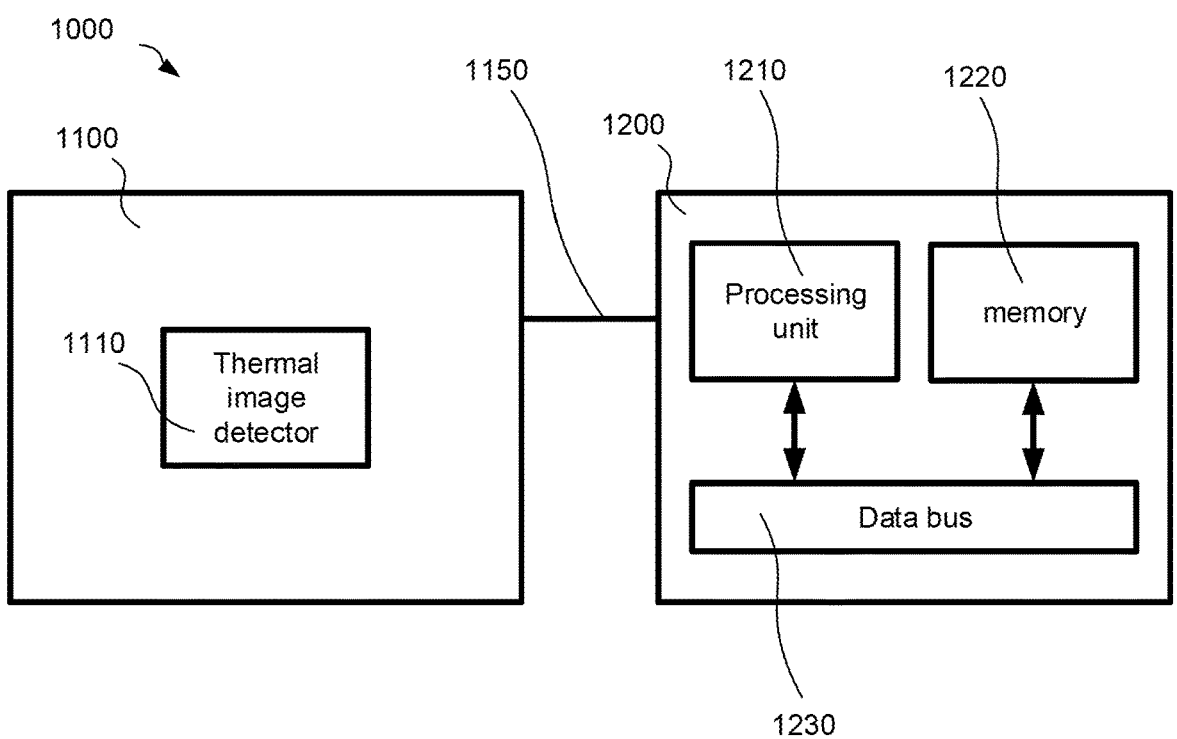
FIG. 4 illustrates a system capable of filtering thermal image data.

FIG. 4 illustrates a system 1000 capable of filtering thermal image data according to, for example, any of the above disclosed method variants. The system 1000 comprises a thermal image detector 1110 and a circuitry 1200. In the example shown in FIG. 4, the thermal image detector 1110 is comprised in a thermal camera 1100. The thermal camera 1100 may be a monitoring camera. Also, in the example shown in FIG. 4, the thermal image detector 1110 and the circuitry 1200 are shown as being separate, however, they may be comprised in the same unit. For instance, the circuitry 1200 may be comprised in the thermal camera 1100.

The circuitry comprises a processing unit 1210 and a memory 1220. The processing unit 1210 and the memory 1220 may communicate via wireless or wired communication, in this example represented by a data bus 1230.

The thermal image detector 1110 is configured to capture thermal image data representing a scene towards which the thermal camera 1100 is directed. The thermal image detector 1110 is further configured to communicate with the circuitry via the data bus 1150. A skilled person realizes that there is a plurality of suitable wired and wireless connections for communication between the thermal image detector 1110 and the circuitry 1200. In the specific example shown in FIG. 4, the thermal image detector 1110 captures thermal image data corresponding to the image 100 shown in FIG. 1A.

The circuitry 1200 is configured to form a signal distribution of intensity values from the captured thermal image data. Since the thermal image detector 1110 in this specific example captures thermal image data corresponding to the image 100 shown in FIG. 1A, the formed signal distribution of intensity values is the signal distribution of intensity values illustrated in the diagram 200 in FIG. 1B.

The circuitry 1200 is further configured to identify a first part in the signal distribution of intensity values. The first part has an intensity width equal to or smaller than a predetermined intensity span, and is therefore, based on the definition provided in this application, identified as a peak. The predetermined intensity span is based on a resolution parameter of the thermal image detector 1110. In this case, the circuitry 1200 identifies the peak 220 in FIG. 1B, since the first part 220 has an intensity width 222 smaller than the predetermined intensity span.

The circuitry 1200 is further configured to identify a second part of the signal distribution of intensity values. The second part having an intensity width larger than the predetermined intensity span. In this case, the circuitry 1200 identifies the second part 210 in FIG. 1B having the intensity width 212.

The circuitry 1200 is further configured to determine an intensity range 232 between the first part 220 and the second part 210. The circuitry 1200 may use the same procedure to determine the intensity range 232 and the intensity position 236 of the second part as described in relation to FIG. 1B.

The circuitry 1200 is further configured to filter the thermal image data by excluding thermal image data forming part of the first part 220 in the signal distribution of intensity values, if the intensity range 232 is larger than a predetermined minimum intensity range. In this specific example, the predetermined minimum intensity range is based on a signal strength response parameter of the thermal image detector 1110.

It is to be understood that the circuitry 1200 may be further configured to identify a further peak in the signal distribution of intensity values in the manner as described in relation to FIGS. 3A-C.

Figure 5:
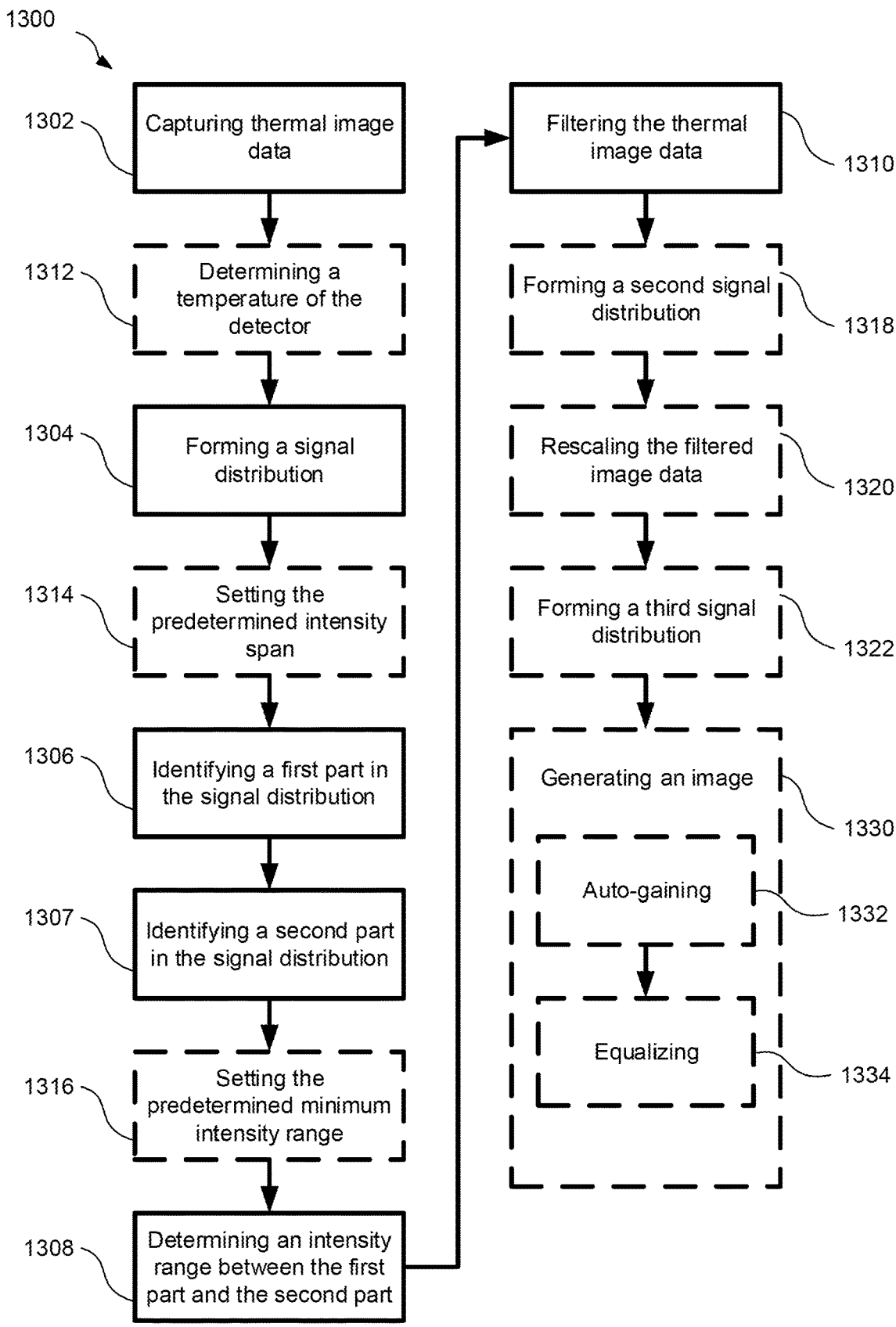
FIG. 5 is a block scheme of a method for filtering thermal image data.

A method 1300 for filtering thermal image data will now be described with further reference to FIG. 5. The method 1300 comprises capturing 1302 thermal image data by a thermal image detector 1110. The method 1300 may further comprise determining 1312 a temperature of the thermal image detector 1110. The temperature may be determined by a thermal sensor, for example, by a thermocouple or a similar sensor.

The method 1300 further comprises forming 1304 a signal distribution of intensity values from the thermal image data. The formed signal distribution of intensity values may be similar to the signal distributions of intensity values shown in FIG. 1B and FIG. 3B.

The method 1300 further comprises identifying 1306 a first part in the signal distribution of intensity values. The first part has an intensity width equal to or smaller than a predetermined intensity span, and is therefore, based on the definition provided in this application, identified as a peak. The predetermined intensity span is based on a resolution parameter of the thermal image detector 1110. The resolution parameter of the thermal image detector 1110 may be temperature dependent, and the method 1300 may further comprise setting 1314 the predetermined intensity span based on the determined temperature of the thermal image detector 1110.

The method 1300 further comprises identifying 1307 a second part in the signal distribution of intensity values. The second part has an intensity width larger than the predetermined intensity span, and is therefore not identified as a peak based on the definition provided in this application.

The method 1300 further comprises determining 1308 an intensity range between the first part and the second part. A predetermined minimum intensity range is based on a signal strength response parameter of the thermal image detector 1110. The signal strength response parameter may be temperature dependent, and the method 1300 may further comprise setting 1316 a predetermined minimum intensity range based on the determined temperature of the thermal image detector.

The method 1300 further comprises filtering 1310, if the intensity range is larger than the predetermined minimum intensity range, the thermal image data by excluding thermal image data forming part of the first part in the signal distribution of intensity values.

The method 1300 may further comprise forming 1318 a second signal distribution of intensity values from the filtered thermal image data.

The method 1300 may further comprise rescaling 1320 the filtered thermal image data, and forming 1322 a third signal distribution of intensity values from the rescaled filtered thermal image data. The rescaling 1320 may be performed such that the third signal distribution of intensity values has an intensity level range larger than an intensity level range of the second signal distribution of intensity values.

The method 1300 may further comprise generating 1330 an image based on the rescaled and/or filtered thermal image data. The act of generating 1330 the image may comprise auto-gaining 1332 the rescaled and/or filtered thermal image data, and/or equalizing 1334 the rescaled and/or filtered thermal image data.

The method 1300 may be performed by a single processing unit or by multiple processing units performing different parts of the method 1300. It is realized that some parts of the method 1300 may be performed in parallel, for example capturing 1302 thermal image data and determining 1312 a temperature of the detector. Hence, the method 1300 does not need to be performed in the exact serial manner as illustrated in FIG. 5. It is also understood that all illustrated acts are not necessary to achieve the method as claimed.

The person skilled in the art realizes that the present concept by no means is limited to the preferred variants described above. On the contrary, many modifications and variations are possible within the scope of the appended claims.

For example, the intensity value defining the intensity position of the peak may be an intensity value at which the peak has a signal strength larger than a predetermined threshold signal level. The predetermined threshold signal level may relate to the signal strength response parameter of the thermal image detector.

Additionally, variations to the disclosed variants can be understood and effected by the skilled person in practicing the present teachings, from a study of the drawings, the disclosure, and the appended claims. The mere fact that certain measures are recited in mutually different dependent claims does not indicate that a combination of these measured cannot be used to advantage.

What is claimed is:

1. A method for filtering thermal image data, the method comprising:
    capturing thermal image data by a thermal image detector;
    forming a signal distribution of intensity values from the thermal image data;
    identifying a first part in the signal distribution of intensity values, the first part being a peak having an intensity width equal to or smaller than a predetermined intensity span being based on a resolution parameter of the thermal image detector;
    identifying a second part of the signal distribution of intensity values, the second part having an intensity width larger than the predetermined intensity span;
    determining an intensity range between the first part and the second part; and
    filtering, if the intensity range is larger than a predetermined minimum intensity range, the thermal image data by excluding thermal image data forming part of the first part in the signal distribution of intensity values.

2. The method according to claim 1, wherein the predetermined minimum intensity range is based on a signal strength response parameter of the thermal image detector.

3. The method according to claim 1, the method further comprising:
    forming a second signal distribution of intensity values from the filtered thermal image data;
    rescaling the filtered thermal image data; and
    forming a third signal distribution of intensity values from the rescaled filtered thermal image data, the third signal distribution of intensity values spanning an intensity level range larger than an intensity level range of the second signal distribution of intensity values.

4. The method according to claim 2, wherein the signal strength response parameter is temperature dependent, and wherein the method further comprises:
    determining a temperature of the thermal image detector; and
    setting the predetermined minimum intensity range based on the determined temperature of the thermal image detector.

5. The method according to claim 1, wherein the resolution parameter is temperature dependent, and wherein the method further comprises:
    determining a temperature of the thermal image detector; and
    setting the predetermined intensity span based on the determined temperature of the thermal image detector.

6. The method according to claim 1, wherein the predetermined intensity span is a predetermined multiple of the resolution parameter.

7. The method according to claim 1, wherein the intensity width of the first part is equal to the width of the first part at a predetermined fraction of a maximum value of the first part.

8. The method according to claim 1, wherein the resolution parameter is a signal-to-noise figure of the thermal image detector.

9. The method according to claim 1, the method further comprising:
identifying a further part in the signal distribution of intensity values, the further part being a further peak having an intensity width equal to or smaller than a further predetermined intensity span being based on the resolution parameter of the thermal image detector;
determining a further intensity range between the second part and the further part; and
filtering, if the further intensity range is larger than a further predetermined minimum intensity range, the thermal image data by excluding thermal image data forming part of the further part in the signal distribution of intensity values.

10. The method according to claim 1, the method further comprising:
generating an image based on the rescaled and/or filtered thermal image data.

11. The method according to claim 10, wherein the method further comprises one or more acts chosen from the group consisting of:
auto-gaining the rescaled and/or filtered thermal image data; and
equalizing the rescaled and/or filtered thermal image data.

12. A system comprising:
a thermal image detector configured to capture thermal image data;
a circuitry configured to:
form a signal distribution of intensity values from the thermal image data;
identify a first part in the signal distribution of intensity values, the first part being a peak having an intensity width equal to or smaller than a predetermined intensity span being based on a resolution parameter of the thermal image detector;
identify a second part of the signal distribution of intensity values, the second part having an intensity width larger than the predetermined intensity span;
determine an intensity range between the first part and the second part; and
filter, if the intensity range is larger than a predetermined minimum intensity range, the thermal image data by excluding thermal image data forming part of the first part in the signal distribution of intensity values.

13. The system according to claim 12, wherein the predetermined minimum intensity range is based on a signal strength response parameter of the thermal image detector.

14. The system according to claim 12, wherein the circuitry is further configured to:
identify a further part in the signal distribution of intensity values, the further part being a further peak having an intensity width equal to or smaller than a further predetermined intensity span being based on a resolution parameter of the thermal image detector;
determine a further intensity range between the second part and the further part; and
filter, if the further intensity range is larger than a further predetermined minimum intensity range, the thermal image data by excluding thermal image data forming part of the further part in the signal distribution of intensity values.

15. A non-transitory computer readable storing medium including instructions which, when executed on a device having a processing capability, cause the device to execute instructions for filtering thermal image data, the instructions causing the device to perform operations comprising:
capturing thermal image data by a thermal image detector;
forming a signal distribution of intensity values from the thermal image data;
identifying a first part in the signal distribution of intensity values, the first part being a peak having an intensity width equal to or smaller than a predetermined intensity span being based on a resolution parameter of the thermal image detector;
identifying a second part of the signal distribution of intensity values, the second part having an intensity width larger than the predetermined intensity span;
determining an intensity range between the first part and the second part; and
filtering, if the intensity range is larger than a predetermined minimum intensity range, the thermal image data by excluding thermal image data forming part of the first part in the signal distribution of intensity values.

* * * * *